United States Patent Office 3,482,998

Patented Dec. 9, 1969

3,482,998

PROCESS FOR PREPARING GROUND MEAT COMPOSITION

David A. Carroll and Simpey Kuramoto, Minneapolis, Minn., assignors to General Mills, Inc., a corporation of Delaware No Drawing. Filed Feb. 17, 1966, Ser. No. 528,100
Int. Cl. A22c; A23j 1/14, 1/20
U.S. Cl. 99—108 8 Claims

ABSTRACT OF THE DISCLOSURE

Ground meat compositions are prepared by adding water and dehydrated fibrous product particles derived from spun edible protein fibers to a natural meat containing about 45 to 55% by weight fat and grinding the resulting admixture. The dehydrated fibrous product particles are used in an amount sufficient to improve the texture and appearance of the ground meat composition containing the fatty natural meat and the water is used in an amount at least sufficient to rehydrate the dehydrated fibrous product particles.

The present invention relates to a novel meat composition and to the process of preparing such composition. More particularly, it relates to the preparation of a ground meat composition from certain natural meats and dehydrated fibrous products derived from spun edible protein fibers.

As a by-product of the meat processing operation, the meat processor has relatively large amounts of inexpensive and unattractive meats available, such cuts containing in the neighborhood of 50% by weight fat. Often the use, sale or disposal of such fatty cuts or tissues means the difference between profit and loss on the total processing operation. Only a certain proportion of these inexpensive and unattractive meats can be tolerated in the production of ground meats without seriously impairing the quality of such ground meats. Thus when the amount thereof is increased beyond a certain point, the ground meat becomes highly unattractive, has a mushy, soft texture and has an undesirably high shrinkage on cooking. Even with the use of extenders and binders, such as toasted soy flour, non-fat dry milk, soy grits, various cereals etc., large amounts of such cheap fatty meats cannot be used in the preparation of quality ground meat products. While such binders or extenders do tend to blot the excess fat of the cheap meats, their use often leads to a loss in texture and off-flavors in the final cooked product. Still further, the processor has available only a certain amount of lean meats to up-grade the said fatty cuts. Also sale of these lean cuts per se tends to yield a greater return than when same are used to up-grade the fatty cuts. It would be highly desirable to provide a process wherein the relatively undesirable, unattractive, fatty meats could be more fully utilized in the preparation of good quality ground meats.

It is an object of our invention to provide a novel ground meat composition. Another object of the invention is to provide a process for preparing good quality ground meats from inexpensive, fatty natural meats. Still another object of the present invention is to provide such a process utilizing dehydrated fibrous products derived from spun edible protein fibers. These and other objects will become apparent from the following detailed description.

We have now discovered that good quality ground meat compositions can be prepared from unattractive and inexpensive natural fatty meats by mixing said fatty meats with dehydrated fibrous products derived from spun edible protein fibers and water and grinding the resulting admixture.

The spun edible protein fibers used in the preparation of the fibrous products can be produced by any of the methods known in the art. Thus, a wide variety of protein materials which are edible can be used in preparing a dispersion or spinning dope which is then transformed into edible fibers or filaments. Representative of such materials are soybean, safflower, corn, peanut and pea proteins, preferably in isolate form, as well as various animal proteins such as casein. The edible protein is dispersed in an alkaline medium in varying amounts, such as from about 10–35% by weight. A suitable alkaline medium is water containing an alkali metal hydroxide, i.e., about 5 to 10% by weight NaOH. The pH of the spinning solution can vary within relatively wide limits but is generally in the range of 9 to 13.5. The temperature of such dispersions is preferably within the range of about 20–45° C. The viscosity of the spinning solution varies widely depending upon whether the solution is subjected to a shearing action or is examined while in a static state. For example, the viscosity of such dispersions may be within the range of about 4000–7000 centipoises during the spinning operation but when the same dispersions are subjected to a very nearly static viscosity examination, such as the Stokes falling sphere experiment, they will exhibit viscosities of a much higher magnitude—i.e. 200,000–300,000 centipoises. Obviously, the viscosity, pH, temperature and concentrations of alkali metal hydroxide and protein will vary somewhat with the particular protein being dispersed. Also, the dispersion may amount to a colloidal solution and it is understood that the use of either the term dispersion or the term colloidal solution is inclusive of the other.

After formation of the dispersion or spinning dope, it is forced through an extrusion device having small holes, such as a spinneret used in the production of rayon, into a coagulating bath which is generally an acid-salt solution. The streamlets coming through the spinneret are thus precipitated in the form of filaments. The filaments issuing from the spinneret, which is actually a small die having from perhaps 1,000 to 16,000 (and preferably 3,000 to 15,000) holes each on the order of 0.002–0.006 (preferably 0.003–0.004) inch in diameter will be a diameter of about 0.002–0.006 (preferably 0.003–0.004) inch. It is also possible to have a series of spinnerets producing filaments from the protein dispersion. Such spinnerets may have the same or different number of holes making it possible to directly produce tows of filaments having the same or different diameters.

The coagulating bath is preferably an aqueous solution of salt and an acid. The salt (i.e., NaCl, for example) can be used in widely varying concentrations such as from about 0.5 to 12% by weight. The acid can be any of those normally used in the coagulating bath. Representative acidic compounds are acetic acid, lactic acid, citric acid, phosphoric acid, adipic acid, hydrochloric acid and the like. The concentration of said acid in the bath is not critical and may vary between about 0.5 to 10% by weight. One or more coagulating baths may be used and the concentrations of acid and salt and the temperatures of such baths may vary (temperatures are normally in the range of about 30 to 90° C.).

A preferred method of preparing the spinning dope and forming the resulting fibers is the continuous process disclosed and claimed in R. W. Westeen et al. Patent No. 3,118,959 which disclosure is incorporated herein by reference.

The filaments or bundles thereof (tows) are preferably and normally stretched by pulling them from the coagulating bath over a take-away reel(s). Preferably, stretching tensions of 50–400% are applied to the filaments or fibers. It is understood, however, that higher or lower tensions can be used and also that the stretching can be performed on a series of reels each with an increasing rate of speed or an increased stretching tension. It is further understood that the stretching of the filaments or fibers can take place in the coagulating bath, after emergence thereof from the said bath, or partly in the bath and partly after emergence from the bath.

The pH of the filaments or bundles leaving the coagulating bath is generally in the range of about 1.0–4.0 which is undesirable since fibrous products prepared therefrom have a sour taste and are normally too dry and tough. Thus, the pH of said filaments is normally raised by water washing or by passing the same through a neutralizing bath which can be a salt solution containing an alkali metal hydroxide or bicarbonate, for example. The water washing or neutralization are preferably carried out until the pH of the fibers is in the range of 5.5 to 6.4. However, the pH may generally be in the range of about 4.0 to about 7.0, if desired. It is understood that the terms "neutralizing" and "neutralization" include any method of raising the pH to the desired degree.

After the neutralization step, the filaments are freed from excess liquid and impregnated with a serum comprising a binder which consists of, or contains a substantial proportion of, a heat coagulable protein such as albumen. A continuous tow of the spun edible protein fibers can be impregnated with the serum. However, the tow of fibers can be cut into various size lengths, such as 1 to 3 inches, prior to such admixture with the binder containing serum. Also, the impregnating serum can contain additional materials such as flavoring agents, colorants and the like. Such materials include various spices and salts, imitation meat flavors, dyes and emulsifiers. The serum can also contain vegetable oils and animal fats and oils. Representative of the latter materials are soybean oil, cottonseed oil, corn oil, coconut oil, palm kernel oil, olive oil, peanut oil, sesame seed oil, safflower oil, tallow, lard, butter, cod-liver oil and the like. Such oils or fats may be partially or fully hydrogenated.

The heat coagulable binder is used in an amount sufficient to bind the edible spun protein fibers into pieces which do not readily disintegrate after being heat-set. Preferably the ratio (dry basis) of binder to fiber will be in the range of about 2:1 to 1:4. A particularly preferred ratio is about 1:1 by weight. As indicated above the binder may consist of albumen. The same is preferably derived from fresh eggs or dried egg white. A preferred binder consists essentially of a mixture of albumen, gluten and particulate defatted oilseed material. The gluten used as part of such a combination binder is preferably wheat gluten. The preferred wheat gluten may be freshly prepared or may be in dehydrated form. Such dried gluten is preferably reconstituted with water to about 50 to 75% $H_2O$ by weight.

The particulate defatted oilseed material used in the preferred combination binder is a flour or meal derived from oilseeds such as soybeans, peanuts, castor beans, safflower seeds, and the like. Said particulate material is preferably prepared from soybeans. The beans are first broken down to form flakes (hulls and the like are removed). The oil is then extracted from the flakes by any suitable means such as with a petroleum solvent and/or an alcohol. A particularly suitable petroleum solvent is hexane. Representative alcohols are ethanol and isopropanol. Aqueous solutions of said alcohols may also be used with the azeotropic solutions being preferred. The solvents are mixed with the oilseed flakes and agitated for a sufficient length of time to remove substantially all of the oil therefrom. It is also possible to first extract the flakes with hexane, for example, followed by extraction thereof with alcohol. The alcohols have a tendency to remove most or all of the bitter ingredients of the oilseed flakes. After extraction, the petroleum solvent and/or alcohol is removed by vapor desolventizing. Thus, hexane-wet flakes, for example, can be subjected to a continuous stream of superheated hexane vapors in a closed system. It is understood that other desolventizing means can be used such as vacuum, warm air drying and the like. In fact, any of the known methods of extracting oils from the oilseed flakes can be used. The substantially solvent- and oil-free flakes are then preferably toasted by heating at elevated temperatures of about 100–150° C. for a few minutes to an hour or more. Such toasting decreases the solubility of the protein particulate material. Additionally, the flakes are preferably reduced in size to a fairly uniform flour having particles which will pass a 100 to 300 mesh screen.

The amounts of albumen, gluten and particulate defatted oilseed material in the preferred combination binder can vary considerably, it being only necessary that such combination binder provides a product having the spun edible protein fibers bound together sufficiently so that the product does not readily disintegrate after being heat set. Preferably, the ratio (dry basis) of gluten to albumen will be about 0.25:1 to 5.0:1. The ratio (dry basis) of particulate defatted oilseed material to albumen is also preferably about 0.25:1 to 5.0:1. Particularly preferred ratios of gluten and defatted oilseed material to albumen are 0.5:1 to 1.5:1. It is also understood that when dehydrated albumen and/or gluten are used enough water will be added thereto or during the impregnation step to rehydrate same.

The spun protein fibers preferably contain about 50 to 80% water by weight prior to the impregnation thereof. It is especially preferred that the fibers contain about 60 to 70% by weight water prior to the said impregnation. As indicated above the fibers can be impregnated with the serum in one step, such serum containing the binder and all of the other desired ingredients. However, less preferably the binder and other ingredients can be applied in more than one step and separately if desired.

The impregnated fibers are then at least partially set-up by heating such as by baking, boiling, broiling and the like. It is only necessary that the heating temperature and time is sufficient to set-up the binder. Temperatures of about 160 to 350° F. are preferred. One preferred method of not only heat setting the impregnated fibers, but also carrying out the impregnating operation, is that disclosed and claimed in John A. Page and Robert C. Dechaine application Ser. No. 380,890, filed July 7, 1964, which disulosure is incorporated herein by reference. In one preferred mode, this process involves the cutting or chopping of the unimpregnated fibers into segments, continuously impregnating the resulting randomly aligned fibers with the serum containing the binder and then moving the fibers and serum aolng a confined passage to induce alignment of the individual fibers to substantially simulate the fiber alignment of natural meat, the fibers and serum preferably being heated during movement along the confined passage to at least partially set-up the impregnated product.

The impregnated fibers after being heat-set generally have a moisture content of about 55% by weight. Preferably at this point, such set-up, impregnated fibers are ground to yield relatively small pieces or particles. Such pieces are normally irregular in shape as is the case with ground, chopped or cubed natural meats. The pieces preferably have a rough diameter or outside dimension of less than about one inch. Especially preferred pieces have a rough diameter of ⅛ to ⅜ inch. Of course, the pieces or particles may be mixed and thus any particular sample may contain different sized pieces or particles in varying amounts. The grinding is preferably completed prior to the drying of the fibrous product. Such grinding can be carried out with conventional meat grinding machines. The resulting pieces or particles are then dehydrated to a moisture content of less than about 7%, and even more preferably to a moisture content in the range of about 1.5 to 2.5% by weight. The dehydration can be effected by conventional means such as by tray drying or forced air drying at temperatures of about 100° to 200° F.

The unattractive, fatty meat cuts utilized in our invention have a fat content of about 45 to 55% by weight. Representative of such cuts are plates, deckles, navels, and the like. Our process has general application to the production of ground meat compositions from such cuts derived from cattle and hogs. Accordingly, our products are meant to closely resemble ground beef or ground pork sausage and the like.

While our compositions can be prepared from the dehydrated fibrous products derived from spun edible protein fibers and the fatty natural meat cuts alone, it is preferred to also include a portion of natural lean meats which contain about 15 to 20% by weight fat. It is also preferred to include a portion of known extending or binding agents. Representative of such materials are bread crumbs, non-fat dry milk, toasted soy flour, soy grits, wheat starch, gluten and the like. Bread crumbs are preferred.

The dehydrated fibrous products derived from the spun edible protein fibers and the fatty natural meat are mixed together with water, and optionally with the lean natural meat, extender or binder and salt, and then ground to produce the ground meat composition of the invention. The water is used in an amount at least sufficient to rehydrate the dehydrated fibrous product granules or particles. All of the ingredients can be initially mixed and then the entire admixture can be ground. However, it is preferred to first grind or chop the fatty meat, or the combination thereof with the lean natural meat, to a size somewhat larger than that ultimately desired—i.e. 2–5 times as large—and then combine same with the dried fibrous product particles, water and optionally an extender or binder. The resulting admixture is then further ground to produce the ground meat composition of our invention resembling good quality ground beef or ground pork sausage. For ease of processing, the water is preferably ice cold or can be in the form of ice. Where lean natural meat is included, another preferred procedure is to grind the lean meat to a size somewhat larger than that ultimately desired (as above indicated), form a slurry thereof with at least a portion of the water (preferably ice or ice water) and optionally salt, add the fatty natural meat to the slurry and chop or grind the admixture so that the meat particles have a size somewhat larger than that ultimately desired (as above indicated), add the dried fibrous product granules or particles, any remaining water and optionally an extender or binder (preferably bread crumbs) and then grind the resulting admixture to produce the ground meat composition of the invention.

The proportions of the ingredients can vary widely. Thus, the dehydrated fibrous product is used in an amount sufficient to improve the texture and appearance of the ground meat composition containing the fatty, natural meat. The water will be used in an amount sufficient to at least rehydrate the dehydrated fibrous product granules of particles. In addition the various ingredients are used in amounts such that the ground meat composition has a fat content of about 20 to 35% by weight prior to being cooked. The compositions preferably contain at least about 5% by weight of the fibrous product (after rehydration). As illustrative of the invention, the following are two preferred compositions:

Ground beef composition (particularly suitable for meatballs)

| Ingredient: | Percent by weight |
|---|---|
| Fat beef (50% fat) | 50–65 |
| Dehydrated fibrous product | 5–20 |
| Water | 5–35 |
| Bread crumbs | 0–6 |
| Salt | 0–2 |

Ground beef composition (particularly suitable for patties)

| Ingredient: | Percent by weight |
|---|---|
| Fat beef (50% fat) | 30–40 |
| Lean beef (15–20% fat) | 10–20 |
| Dehydrated fibrous product | 5–10 |
| Water | 5–35 |
| Bread crumbs | 0–4 |
| Salt | 0–2 |

The following specific examples are furnished for the purpose of illustration only and are not to be construed as placing any limitations on the scope of the present invention.

EXAMPLE I

A tow of soy protein fibers (prepared from isolated soy protein by the procedure of the example of the aforementioned Westeen et al. patent) was cut so that the fibers had lengths of about one to two inches. The fibers had a pH of about 4.0–4.5 and the tow of fibers had a moisture content of about 65–70% by weight. The fibers were continuously impregnated by mixing the same with an impregnating serum. The impregnating serum consisted of the following ingredients:

| | Amount (parts by weight) |
|---|---|
| Oil (a lightly hydrogenated mixture of cottonseed and soybean oils) | 20.01 |
| Water | 51.41 |
| Binder | |
| Dried egg albumen | 12.68 |
| Dried wheat gluten | 12.17 |
| Toasted, defatted soybean flour | 9.89 |
| Mono-sodium glutamate | 0.74 |
| Onion powder | 7.10 |
| Brown sugar | 5.07 |
| Salt (NaCl) | 1.32 |
| Red dye (1% aqueous solution) | 0.30 |
| Hydrolyzed vegetable protein flavor | 1.77 |
| Caramel and cocoa coloring | 0.69 |

The weight ratio of serum to fiber on a dry basis was 2.5:1. The impregnation and mixing were carried out according to the procedure disclosed in the aforementioned Page et al. application. Thus the fibers were impregnated and then continuously moved along a confined passage to induce alignment of the individual fibers. The impregnated fibers were heated to a temperature of about 175° F. during the movement along the confined passage. At the same time they were compressed somewhat. They were then forced through a 3/16 inch die and cut into particles having approximates sizes of 3/16–3/8 inch (rough diameter). The particles or pieces were dried to a moisture content of about 2.5% in a forced air drier at a temperature of 150° F. The dehydrated granules had a particle size of approximately 3/16 inch (rough diameter) although there were some larger and smaller particles.

EXAMPLE II

Example I was repeated except that the serum consisted of the following ingredients:

| | Amount (parts by weight) |
|---|---|
| Oil (a lightly hydrogenated mixture of cottonseed and soybean oils) | 4.0 |
| Water | 316.0 |
| Binder | |
| Dried egg albumen | 50.0 |
| Dried wheat gluten | 48.0 |
| Toasted, defatted oilseed flour | 39.0 |
| Mono-sodium glutamate | 2.9 |
| Onion powder | 4.2 |
| Brown sugar | 20.0 |
| Salt (NaCl) | 5.2 |
| Hydrolyzed vegetable protein flavor | 7.7 |
| Caramel and cocoa coloring | 2.6 |

The serum to fiber ratio on a dry weight basis was 1.5–1.65:1. The resulting dehydrated fibrous product particles were of substantially the same size and moisture content as those of Example I.

EXAMPLE III

A ground meat composition was prepared from 23 parts leaf beef—boneless cow (15–20% fat), 37 parts fat beef—deckles (50% fat), 8 parts of the dehydrated fibrous product granules of Example II, 1 part salt, 3 parts bread crumbs and 28 parts ice water. The lean beef and deckles were first ground through a ⅜ inch plate. Then the remaining ingredients were added with mixing to provide a relatively homogeneous admixture. The admixture was then ground using a $\frac{3}{16}$ inch plate and meat patties were formed. The patties had good texture and appearance. They were readily cooked by frying and the resulting cooked patties had good texture and appearance. They did not curl at the edges. In contrast, a similar composition containing none of the dehydrated fibrous product granules produced patties which were mushy in texture and somewhat unattractive in appearance. Such patties required a longer cooking time and the edges were curled significantly after the frying operation.

EXAMPLE IV

Example III was repeated except that the dehydrated fibrous product granules of example I were used. Results were substantially the same as example III except that the resulting fried patties had some edge curling. However, such curling was less than when no dehydrated fibrous product granules were included.

EXAMPLES V–VII

Example III is repeated except that dried wheat gluten (Example V), toasted soy flour (Example VI), and non-fat dry milk (Example VII) are used in place of the fibrous product granules of Example II. All of the resulting meat compositions have a softer, mushier texture than the meat composition of Example III. The composition of Example V is closest in texture but is rubbery. In addition the composition of Example VI had a distinct off-flavor due to the presence of the toasted soy flour.

EXAMPLE VIII

A ground meat composition was prepared as in Example III using the following ingredients: 62.5 parts fat meat—plates (50%) fat, 6.0 parts of the dehydrated fibrous product granules of Example II, 2.0 parts bread crumbs, 1.0 part salt and 28.5 parts ice water. The resulting composition had good texture and appearance and was highly suitable for the preparation of meatballs and meat loaves.

It is to be understood that the invention is not to be limited to the exact details of operation or the compositions and methods shown and described, as obvious modifications will be apparent to those skilled in the art and the invention is to be limited only by the scope of the appended claims.

The embodiments of the invention in which an exclusive property or privilege is claimed are defined as follows:

1. The process of preparing a ground meat composition which comprises adding water and dehydrated fibrous product particles derived from spun edible protein fibers to a fatty natural meat containing about 45 to 55% by weight fat and grinding the resulting admixture to provide the ground meat composition, said dehydrated fibrous product particles being added in an amount sufficient to improve the texture and appearance of the ground meat composition containing the fatty natural meat and the water being added in an amount at least sufficient to rehydrate the dehydrated fibrous product particles.

2. The process of claim 1 wherein a proportion of lean natural meat containing 15 to 20% by weight fat is also added to the admixture prior to the grinding thereof.

3. The process of claim 1 wherein the dehydrated fibrous product is prepared by adding a serum containing a heat coagulable protein binder to spun edible protein fibers containing about 50 to 80% by weight water, applying heat to at least partially set-up the impregnated fibers and dehydrating the said set-up, impregnated fibers to a moisture content of less than about 7% by weight.

4. The process of claim 1 wherein the fatty natural meat is at least partially ground prior to being admixed with the water and dehydrated fibrous product particles.

5. The process of claim 1 wherein the ground meat composition has a fat content in the range of about 20 to 35% by weight.

6. The process of claim 1 wherein a binder material is also added to the fatty natural meat.

7. The process of claim 1 wherein the dehydrated fibrous product particles are derived from spun isolated soy protein fibers.

8. The process of preparing a ground beef composition which comprises at least partially grinding fatty natural beef meat containing about 45 to 55% by weight fat, adding water and dehydrated fibrous product particles derived from spun edible protein fibers to the at least partially ground natural beef meat, and then grinding the resulting admixture to provide the ground meat composition having a fat content of about 20 to 35% by weight, the said dehydrated fibrous product particles being used in an amount sufficient to improve the texture and appearance of the ground meat composition, the water being used in an amount sufficient to at least rehydrate the dehydrated fibrous product particles and the said particles having been prepared by adding a serum containing a heat coagulable binder to spun edible protein fibers containing about 50 to 80% by weight water, heating to at least partially set-up the impregnated fibers and dehydrating the said set-up impregnated fibers to a moisture content of less than about 7% by weight.

References Cited

UNITED STATES PATENTS

| | | | |
|---|---|---|---|
| 3,197,310 | 7/1965 | Kjelson | 99—14 XR |
| 3,210,195 | 10/1965 | Kjelson et al. | 99—14 |
| 2,682,466 | 6/1954 | Boyer | 99—14 |
| 3,093,483 | 6/1963 | Ishler et al. | 99—14 XR |

RAYMOND N. JONES, Primary Examiner

JAMES R. HOFFMAN, Assistant Examiner

U.S. Cl. X.R.

99—14